United States Patent
Annaka et al.

(10) Patent No.: US 12,062,810 B2
(45) Date of Patent: Aug. 13, 2024

(54) SECONDARY BATTERY AND METHOD OF PRODUCING SAME

(71) Applicant: ZEON CORPORATION, Tokyo (JP)

(72) Inventors: Koji Annaka, Tokyo (JP); Masanobu Sato, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 602 days.

(21) Appl. No.: 17/273,812

(22) PCT Filed: Sep. 25, 2019

(86) PCT No.: PCT/JP2019/037695
§ 371 (c)(1),
(2) Date: Mar. 5, 2021

(87) PCT Pub. No.: WO2020/067208
PCT Pub. Date: Apr. 2, 2020

(65) Prior Publication Data
US 2021/0351479 A1    Nov. 11, 2021

(30) Foreign Application Priority Data
Sep. 28, 2018  (JP) .................................. 2018-185818

(51) Int. Cl.
*H01M 10/0525* (2010.01)
*H01M 10/0585* (2010.01)
*H01M 50/46* (2021.01)

(52) U.S. Cl.
CPC ..... *H01M 50/461* (2021.01); *H01M 10/0525* (2013.01); *H01M 10/0585* (2013.01)

(58) Field of Classification Search
CPC ......... H01M 10/0525; H01M 10/0585; H01M 10/4235; H01M 4/13; H01M 50/403;
(Continued)

(56) References Cited

U.S. PATENT DOCUMENTS

2019/0221808 A1   7/2019  Honda et al.
2019/0273246 A1*  9/2019  Kono ................... H01M 4/622

FOREIGN PATENT DOCUMENTS

JP  2012204303 A  10/2012
JP  2013145763 A   7/2013
(Continued)

OTHER PUBLICATIONS

May 19, 2022, the Extended European Search Report issued by the European Patent Office in the corresponding European Patent Application No. 19864713.3.
(Continued)

*Primary Examiner* — Victoria H Lynch
(74) *Attorney, Agent, or Firm* — KENJA IP LAW PC

(57) ABSTRACT

A secondary battery includes a laminate in which a positive electrode, separator, and negative electrode are stacked in stated order. The coating weight of an adhesive material at a surface Z that is an affixing surface X of the positive electrode and separator and/or an affixing surface Y of the negative electrode and separator satisfies relationship formula (1): $A (g/m^2)+0.02 (g/m^2)<B (g/m^2)$. In formula (1), A represents coating weight in an inner region P at surface Z and B represents coating weight in an outer region Q at surface Z. Inner region P is a region that has a center of surface Z as a center, has a similar shape to a shape of surface Z, and has an area equivalent to 80% of area of surface Z, and outer region Q is all regions other than inner region P at surface Z.

5 Claims, 7 Drawing Sheets

(58) Field of Classification Search
CPC ... H01M 50/417; H01M 50/461; Y02E 60/10; Y02P 70/50
See application file for complete search history.

(56) References Cited

FOREIGN PATENT DOCUMENTS

| | | |
|---|---|---|
| JP | 2017027945 A | 2/2017 |
| WO | 2018030002 A1 | 2/2018 |
| WO | 2018060773 A1 | 4/2018 |

OTHER PUBLICATIONS

Mar. 23, 2021, International Preliminary Report on Patentability issued in the International Patent Application No. PCT/JP2019/037695.

\* cited by examiner

SECONDARY BATTERY AND METHOD OF PRODUCING SAME

TECHNICAL FIELD

The present disclosure relates to a secondary battery and a method of producing the same.

BACKGROUND

Secondary batteries such as lithium ion secondary batteries have characteristics such as compact size, light weight, high energy-density, and the ability to be repeatedly charged and discharged, and are used in a wide range of applications. A secondary battery generally includes battery members such as a positive electrode, a negative electrode, and a separator that isolates the positive electrode and the negative electrode from each other and prevents short circuiting between the positive and negative electrodes.

Known secondary battery structures include a stacked structure in which a positive electrode, a separator, and a negative electrode are stacked alternately and a wound structure in which an elongated positive electrode, separator, and negative electrode are overlapped and then wound up concentrically. In particular, stacked secondary batteries have been attracting interest in recent years from a viewpoint of having excellent energy density, safety, quality, and durability.

In production of a secondary battery, a battery member having an adhesive material at a surface thereof may be produced, and this battery member may then be affixed to another battery member, for example. Moreover, a battery member having an adhesive material at a surface thereof can be produced by applying, onto the battery member surface, a composition for adhesion (slurry for a secondary battery) containing a polymer (binder) displaying adhesiveness and so forth that are dispersed and/or dissolved in a solvent, and then drying the composition for adhesion (for example, refer to Patent Literature (PTL) 1).

CITATION LIST

Patent Literature

PTL 1: JP2017-27945A

SUMMARY

Technical Problem

It is desirable to cause electrolyte solution to permeate to a central part of a positive electrode or a negative electrode in a secondary battery from a viewpoint of productivity and life characteristics (safety).

However, there have been instances in which it has not been possible to cause electrolyte solution to permeate to a central part of a positive electrode or a negative electrode in a conventional secondary battery such as described above.

Accordingly, one object of the present disclosure is to provide a secondary battery that can improve permeability (injectability) of electrolyte solution to a central part of a positive electrode or a negative electrode.

Another object of the present disclosure is to provide a method of producing a secondary battery that enables efficient production of a secondary battery that can improve permeability (injectability) of electrolyte solution to a central part of a positive electrode or a negative electrode.

Solution to Problem

The inventors conducted diligent studies with the aim of achieving the objects set forth above. The inventors discovered that it is possible to improve permeability (injectability) of electrolyte solution to a central part of a positive electrode or a negative electrode through the coating weight of an adhesive material at a surface Z that is either or both of an affixing surface X of a positive electrode and a separator and an affixing surface Y of a negative electrode and a separator satisfying a specific relationship formula (coating weight in an inner region being smaller than coating weight in an outer region), and, in this manner, the inventors completed the present disclosure.

Specifically, the present disclosure aims to advantageously solve the problem set forth above, and a presently disclosed secondary battery comprises a laminate in which a positive electrode, a separator, and a negative electrode are stacked in stated order, wherein coating weight of an adhesive material at a surface Z that is either or both of an affixing surface X of the positive electrode and the separator and an affixing surface Y of the negative electrode and the separator satisfies a relationship formula (1), shown below, $$A(g/m^2)+0.02(g/m^2)<B(g/m^2) \qquad (1)$$

where, in the relationship formula (1), A represents coating weight in an inner region P at the surface Z and B represents coating weight in an outer region Q at the surface Z, given that the inner region P is a region that has a center of the surface Z as a center, has a similar shape to a shape of the surface Z, and has an area equivalent to 80% of area of the surface Z, and the outer region Q is all regions other than the inner region P at the surface Z.

A secondary battery for which the coating weight of an adhesive material at a surface Z satisfies a specific relationship formula (coating weight in an inner region being smaller than coating weight in an outer region) in this manner can improve permeability of electrolyte solution to a central part of a positive electrode or a negative electrode.

Note that the "center" of a "surface" or "region" referred to in the present specification is the "center of mass" of the "surface" or "region". The "center" of a "surface" or "region" ("center of mass" of a "surface" or "region") is, for example, the "intersection of diagonals" in a case in which the shape of the surface or region is a square, a rectangle, a parallelogram, or a rhombus, the "intersection of medians" in a case in which the shape of the surface or region is a triangle, and the "center of a circle" in a case in which the shape of the surface or region is a circle.

In the presently disclosed secondary battery, coating weight C of the adhesive material for the surface Z as a whole is preferably not less than 0.01 g/m² and not more than 1.00 g/m². When the coating weight C of the adhesive material for the entire surface Z is not less than 0.01 g/m² and not more than 1.00 g/m², sufficient adhesive strength of an electrode and a separator can be ensured.

In the presently disclosed secondary battery, coating weight A of the adhesive material in the inner region P is preferably not less than 0 g/m² and not more than 0.20 g/m². When the coating weight A of the adhesive material in the inner region P is not less than 0 g/m² and not more than 0.20 g/m², sufficient adhesive strength can be ensured while also reliably improving permeability of electrolyte solution to a central part of a positive electrode or a negative electrode.

In the presently disclosed secondary battery, coating weight B in the outer region Q is preferably not less than 0.05 g/m$^2$ and not more than 0.30 g/m$^2$. When the coating weight B in the outer region Q is not less than 0.05 g/m$^2$ and not more than 0.30 g/m$^2$, sufficient adhesive strength can be ensured while also reducing the lithium deposition rate on a negative electrode.

In the presently disclosed secondary battery, the adhesive material preferably has a degree of swelling of not less than 110% and not more than 1500% in a mixed solvent of ethylene carbonate and diethyl carbonate in which a volume ratio of ethylene carbonate/diethyl carbonate is 3/7. When the degree of swelling of the adhesive material in a mixed solvent of ethylene carbonate and diethyl carbonate (volume ratio: ethylene carbonate/diethyl carbonate=3/7) is not less than 110% and not more than 1500%, permeability of electrolyte solution to a central part of a positive electrode or a negative electrode can be reliably improved.

In the presently disclosed secondary battery, the adhesive material has preferably been formed in a dotted shape. When the adhesive material is formed in a dotted shape, resistance of the secondary battery can be reduced.

Moreover, the present disclosure aims to advantageously solve the problem set forth above, and a presently disclosed method of producing a secondary battery is a method of producing a secondary battery including a laminate in which a positive electrode, a separator, and a negative electrode are stacked in stated order, comprising: a first application step of applying an adhesive material with a first application amount in a first region at a surface Z that is either or both of an affixing surface X of the positive electrode and the separator and an affixing surface Y of the negative electrode and the separator; and a second application step of applying an adhesive material with a second application amount in a second region disposed further inward than the first region at the surface Z, wherein the first application amount is more than the second application amount. By using the method of producing a secondary battery set forth above, it is possible to efficiently produce a secondary battery that can improve permeability of electrolyte solution to a central part of a positive electrode or a negative electrode.

Advantageous Effect

According to the present disclosure, it is possible to obtain a secondary battery that can improve permeability of electrolyte solution to a central part of a positive electrode or a negative electrode.

Moreover, according to the present disclosure, it is possible to efficiently produce a secondary battery that can improve permeability of electrolyte solution to a central part of a positive electrode or a negative electrode.

DETAILED DESCRIPTION

Figure 1A:
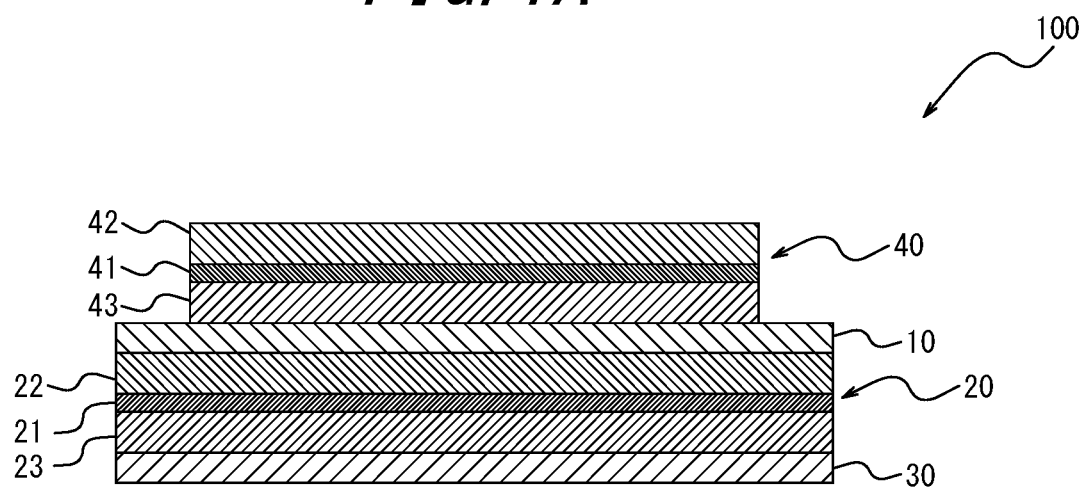
FIG. 1A is a front view illustrating the structure of one example of a laminate in a presently disclosed secondary battery.

The following describes the presently disclosed secondary battery and method of producing a secondary battery with reference to the drawings. Note that the dimensions of some members in the drawings are enlarged or reduced in order to facilitate understanding.

(Secondary Battery)

The presently disclosed secondary battery includes at least a specific laminate and may include an electrolyte solution and other members as necessary. Moreover, the presently disclosed secondary battery can be produced using the presently disclosed method of producing a secondary battery, for example.

<Laminate>

The laminate in the presently disclosed secondary battery is a laminate in which a positive electrode, a separator, and a negative electrode are stacked in stated order.

Figure 1B:
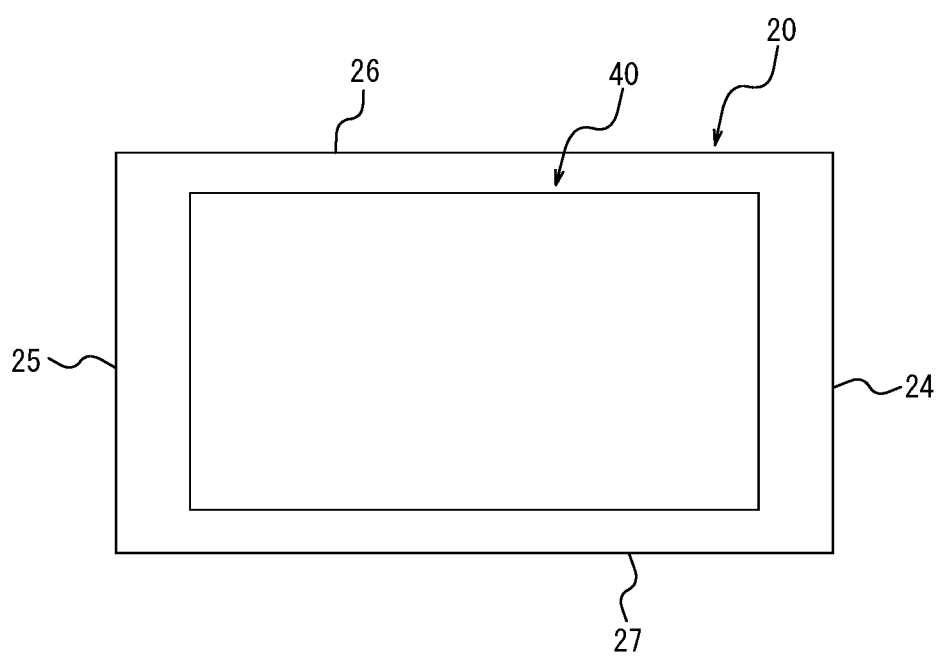
FIG. 1B is a plan view for describing a positional relationship of a negative electrode and a positive electrode in the laminate illustrated in FIG. 1A.
Figure 2:
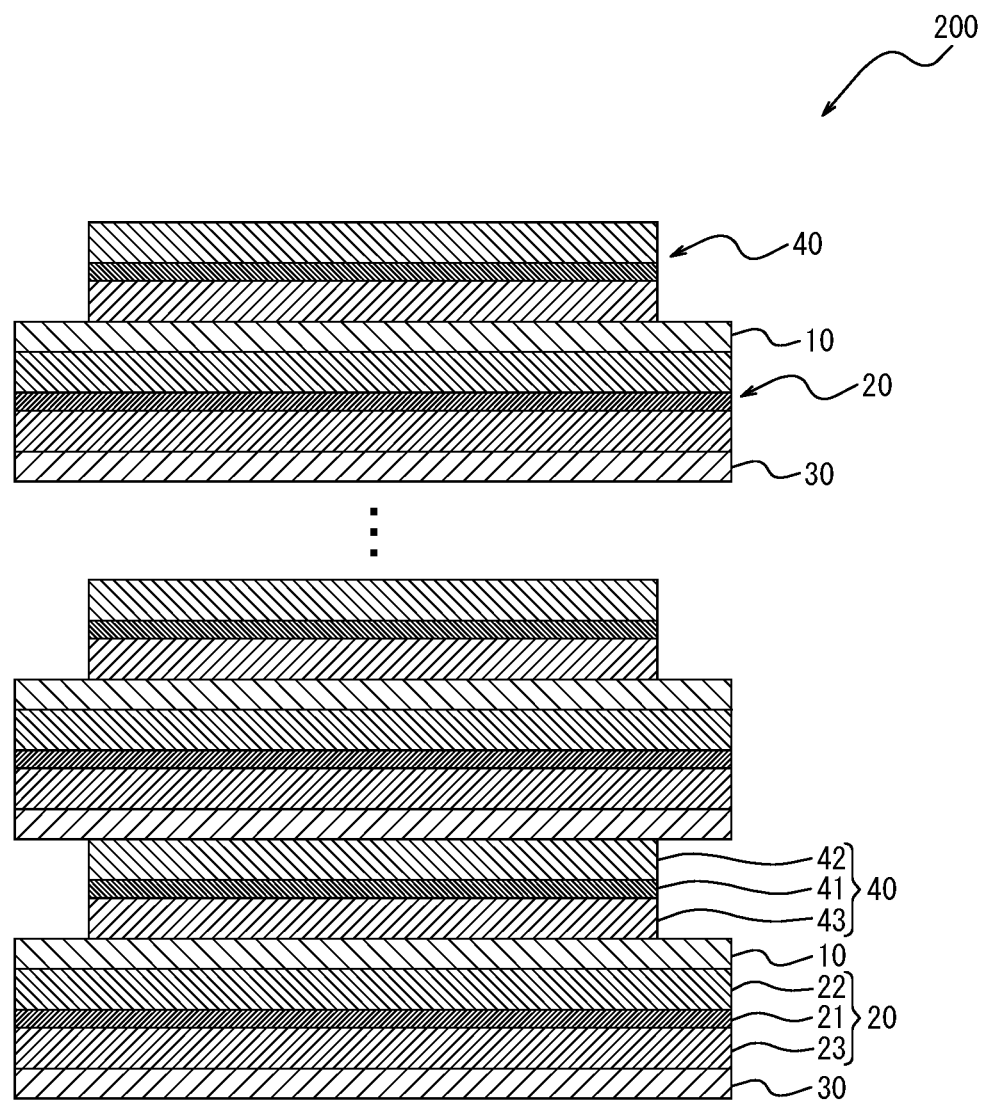
FIG. 2 is a front view illustrating the structure of one example of a stack obtained through stacking of laminates in a presently disclosed secondary battery.
Figure 3:
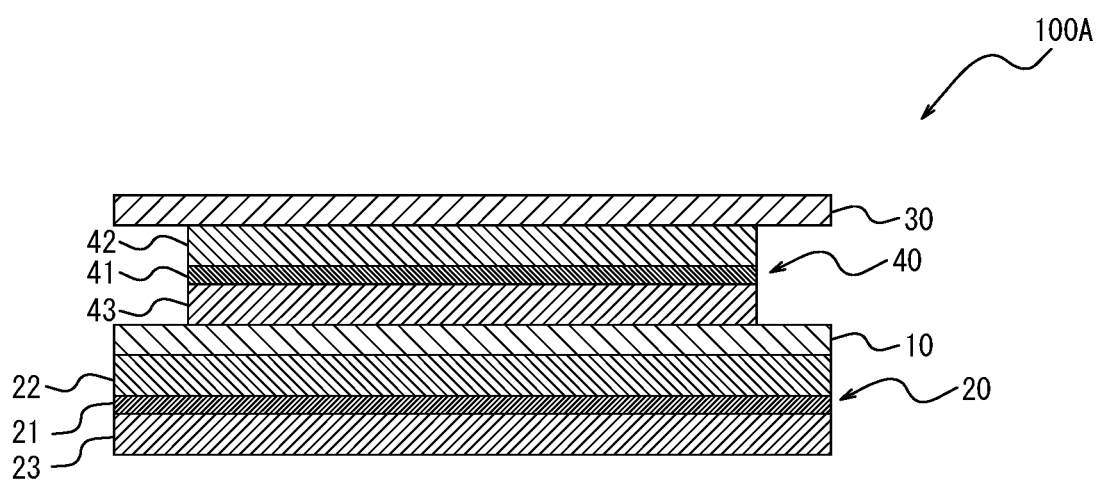
FIG. 3 is a front view illustrating the structure of another example of a laminate in a presently disclosed secondary battery.

Note that the laminate in the presently disclosed secondary battery may have a structure such as illustrated in FIGS. 1A and 1B or a structure such as illustrated in FIG. 3, for example. Moreover, the laminate may be stacked to obtain a stack 200 as illustrated in FIG. 2, for example, and can then be used in a stacked secondary battery or the like.

As illustrated in FIGS. 1A and 1B or FIG. 3, the laminate 100 or 100A includes a negative electrode 20, a first separator 10 affixed to one surface of the negative electrode, a positive electrode 40 affixed to a surface of the first separator 10 at the opposite side thereof to the negative electrode 20, and a second separator 30 affixed to the other surface of the negative electrode 20 or a surface of the positive electrode 40 at the opposite side thereof to the first separator 10.

Moreover, in the laminate 100 or 100A, the positive electrode 40 has a smaller size in plan view than the negative electrode 20, the first separator 10, and the second separator 30 as illustrated in FIG. 1B. More specifically, the negative electrode 20 of the laminate 100 or 100A includes a first edge 24 and a second edge 25 that are in opposition in an orthogonal direction to a stacking direction, and the positive electrode 40 is located between the first edge 24 and the second edge 25 when viewed in the stacking direction. Note that the first edge 24 and the second edge 25 are normally edges that correspond to cutting positions where an elongated negative electrode web has been cut to obtain the negative electrode 20.

The laminate 100 illustrated in the front view of FIG. 1A includes a negative electrode 20, a first separator 10 affixed to one surface (upper surface in FIG. 1A) of the negative electrode 20, a positive electrode 40 affixed to a surface of the first separator 10 at the opposite side thereof (upper side in FIG. 1A) to the negative electrode 20, and a second separator 30 affixed to the other surface of the negative electrode 20. In this example, the first separator 10, the negative electrode 20, the second separator 30, and the positive electrode 40 each have a rectangular shape in plan view. The negative electrode 20 has a structure in which negative electrode mixed material layers 22 and 23 containing a negative electrode active material have been formed at both surfaces of a negative electrode current collector 21. The positive electrode 40 has a structure in which positive electrode mixed material layers 42 and 43 containing a positive electrode active material have been formed at both surfaces of a positive electrode current collector 41. The positive electrode 40 has a smaller size in plan view than the negative electrode 20, the first separator 10, and the second separator 30 and, as illustrated by the plan view positional relationship of the negative electrode 20 and the positive electrode 40 in FIG. 1B, the positive electrode 40 is located between a first edge 24 and a second edge 25 of the negative electrode 20 that are in opposition in an orthogonal direction (left/right direction in FIG. 1B) to the stacking direction and also between a third edge 26 and a fourth edge 27 of the negative electrode 20 that extend in the left/right direction in FIG. 1B and are orthogonal to the first edge 24 and the second edge 25.

The laminate 100A illustrated in the front view of FIG. 3 has the same configuration as the laminate 100 illustrated in FIGS. 1A and 1B with the exception that the second separator 30 is affixed to a surface of the positive electrode 40 at the opposite side thereof (upper side in FIG. 3) to the first separator 10 instead of being affixed to the other surface of the negative electrode 20.

It should be noted, however, that the laminate in the presently disclosed secondary battery is not limited to the examples illustrated in FIGS. 1A and 1B and FIG. 3. For example, the first separator 10 and the second separator 30 may have a larger size in plan view than the negative electrode 20 in the laminate. By using a laminate in which the first separator 10 and the second separator 30 are larger than the negative electrode 20, safety of the secondary battery can be further increased.

<<Surface Z, Inner Region P, and Outer Region Q>>

Figure 4:
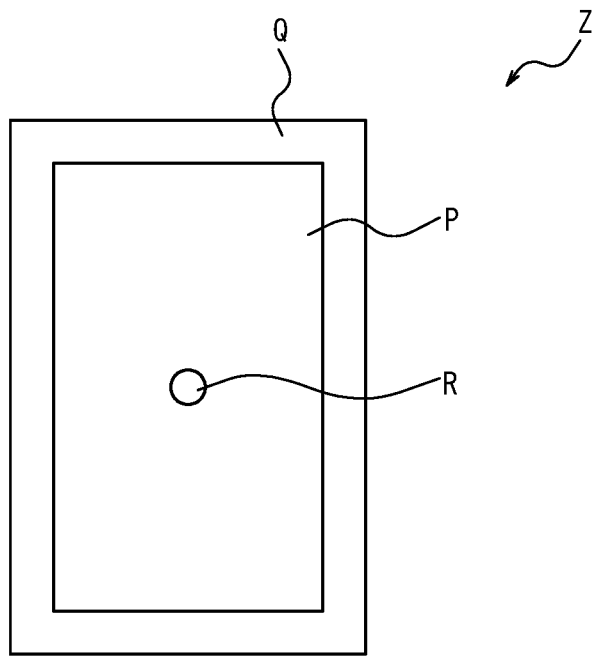
FIG. 4 is an explanatory diagram for describing an inner region P and an outer region Q at a surface Z.

The following describes an inner region P and an outer region Q at a surface Z using FIG. 4.

The surface Z is either or both of an affixing surface X of the negative electrode 20 and the first separator 10 and an affixing surface Y of the positive electrode 40 and the first separator 10.

As illustrated in FIG. 4, the inner region P is a region that has a center (center of mass) R of the surface Z (intersection of diagonals of a rectangle in FIG. 4) as a center (center of mass), that has a similar shape to a shape of the surface Z (rectangle in FIG. 4), and that has an area equivalent to 80% of the area of the surface Z. The outer region Q is all regions other than the inner region P at the surface Z and is a region that has an area equivalent to 20% of the area of the surface Z.

In the laminate of the presently disclosed secondary battery, the coating weight of an adhesive material at the surface Z satisfies the following relationship formula (1).

$$A(g/m^2)+0.02(g/m^2)<B(g/m^2) \quad (1)$$

(In formula (1), A represents the coating weight in the inner region P and B represents the coating weight in the outer region Q.)

A secondary battery in which the coating weight of an adhesive material at a surface Z satisfies a specific relationship formula (coating weight in an inner region being smaller than coating weight in an outer region) in this manner can improve permeability of electrolyte solution to a central part of a positive electrode or a negative electrode.

The coating weight C of the adhesive material for the entire surface Z is preferably 0.01 $g/m^2$ or more, and preferably 0.05 $g/m^2$ or more, and is preferably 1.00 $g/m^2$ or less, more preferably 0.25 $g/m^2$ or less, particularly preferably 0.20 $g/m^2$ or less, and most preferably 0.15 $g/m^2$ or less. When the coating weight C is not less than any of the lower limits set forth above, sufficient adhesive strength of an electrode and a separator can be ensured. Moreover, when the coating weight C is not more than any of the upper limits set forth above, deterioration of cycle characteristics of the secondary battery can be inhibited.

The coating weight A of the adhesive material in the inner region P is preferably 0 $g/m^2$ or more, and is preferably 0.20 $g/m^2$ or less, more preferably 0.15 $g/m^2$ or less, and particularly preferably 0.10 $g/m^2$ or less. When the coating weight A is not more than any of the upper limits set forth above, sufficient adhesive strength can be ensured while also reliably improving permeability of electrolyte solution to a central part of a positive electrode or a negative electrode.

A ratio of coverage of the adhesive material in the inner region P (area covered by adhesive material in inner region P/area of entire inner region P) is preferably 1.0% or more, and is preferably 50% or less, more preferably 30% or less, and particularly preferably 20% or less. When the ratio of coverage of the adhesive material in the inner region P is not less than the lower limit set forth above, sufficient adhesive strength of an electrode and a separator can be ensured. When the ratio of coverage of the adhesive material in the inner region P is not more than any of the upper limits set forth above, permeability of electrolyte solution to a central part of a positive electrode or a negative electrode can be reliably improved.

The coating weight B of the adhesive material in the outer region Q is required to be at least 0.02 $g/m^2$ more than the coating weight A of the adhesive material in the inner region P, is preferably 0.05 $g/m^2$ or more, and is preferably 0.30 $g/m^2$ or less, more preferably 0.20 $g/m^2$ or less, and particularly preferably 0.15 $g/m^2$ or less. When the coating weight B is not less than the lower limit set forth above, sufficient adhesive strength of an electrode and a separator can be ensured. Moreover, when the coating weight B is not more than any of the upper limits set forth above, the lithium deposition rate on a negative electrode can be reduced.

The following describes, for a case in which the adhesive material is applied at the surface Z such that two regions are present ("region S where the adhesive material is applied densely" and "region T where the adhesive material is applied sparsely"), the "area of the region T where the adhesive material is applied sparsely", the "coating weight D of the adhesive material in the region S where the adhesive material is applied densely", and the "coating weight E of the adhesive material in the region T where the adhesive material is applied sparsely".

Note that the "region T where the adhesive material is applied sparsely" has the center (center of mass) of the surface Z as a center (center of mass) and has a similar shape to the shape of the surface Z, and the "region S where the adhesive material is applied densely" is all regions other than the "region T where the adhesive material is applied sparsely" at the surface Z.

The area of the region T where the adhesive material is applied sparsely is preferably 10% or more, more preferably 30% or more, and particularly preferably 50% or more relative to the area of the surface Z, and is preferably 80% or less, and more preferably 70% or less relative to the area of the surface Z. When the area of the region T where the adhesive material is applied sparsely is not less than any of the lower limits set forth above, permeability of electrolyte solution to a central part of a positive electrode or a negative electrode can be reliably improved. Moreover, when the area of the region T where the adhesive material is applied sparsely is not more than any of the upper limits set forth above, sufficient adhesive strength of an electrode and a separator can be ensured.

The coating weight D of the adhesive material in the region S where the adhesive material is applied densely is preferably 0.05 g/m² or more, and is preferably 0.30 g/m² or less, more preferably 0.20 g/m² or less, and particularly preferably 0.15 g/m² or less. When the coating weight D is not less than the lower limit set forth above, sufficient adhesive strength of an electrode and a separator can be ensured. Moreover, when the coating weight D is not more than any of the upper limits set forth above, the lithium deposition rate on a negative electrode can be reduced.

The coating weight E of the adhesive material in the region T where the adhesive material is applied sparsely is preferably 0 g/m² or more, and is preferably 0.15 g/m² or less, more preferably 0.10 g/m² or less, and particularly preferably 0.05 g/m² or less. When the coating weight E is not more than any of the upper limits set forth above, sufficient adhesive strength can be ensured while also reliably improving permeability of electrolyte solution to a central part of a positive electrode or a negative electrode.

[Adhesive Material]

Any adhesive material that is used in the field of secondary batteries can be used as the adhesive material without any specific limitations so long as it does not impair battery reactions. In particular, an adhesive material formed of a polymer is preferable as the adhesive material. Note that the adhesive material may be formed of just one type of polymer or may be formed of two or more types of polymers.

Examples of polymers that can be used as the adhesive material include, but are not specifically limited to, fluoropolymers such as polyvinylidene fluoride and polyvinylidene fluoride-hexafluoropropylene (PVdF-HFP) copolymer; conjugated diene polymers such as styrene-butadiene copolymer (SBR) and acrylonitrile-butadiene copolymer (NBR); hydrogenated products of conjugated diene polymers; polymers that include a (meth)acrylic acid alkyl ester monomer unit (acrylic polymers); and polyvinyl alcohol polymers such as polyvinyl alcohol (PVA).

Note that in the present disclosure, "(meth)acrylic acid" is used to indicate "acrylic acid" and/or "methacrylic acid".

The form of the adhesive material formed of a polymer is not specifically limited and may be a particulate form, a non-particulate form, or a combination of a particulate form and a non-particulate form.

Figure 5:
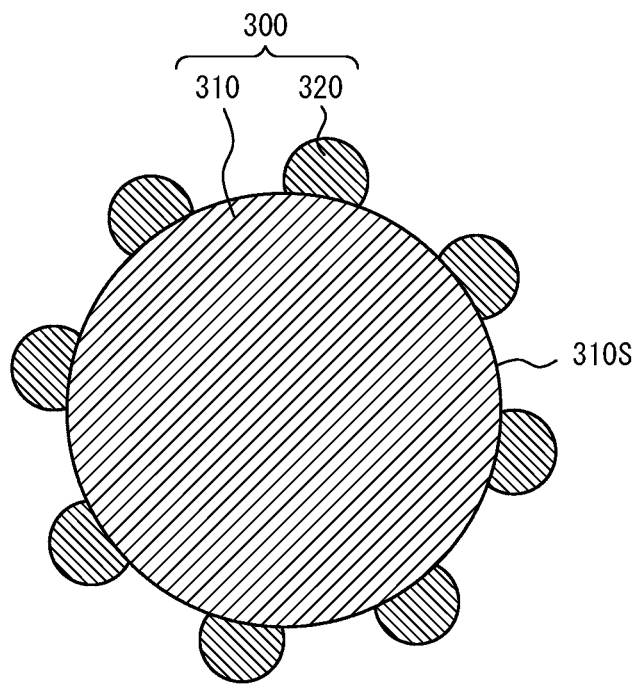
FIG. 5 is a cross-sectional view schematically illustrating the structure of one example of a particulate polymer.

Note that in a case in which the adhesive material formed of a polymer is a particulate polymer, the adhesive material of that particulate polymer may be monophase structure particles that are formed from a single polymer or may be heterophase structure particles that are formed through physical or chemical bonding of two or more different polymers. Specific examples of heterophase structures include a core-shell structure in which a central portion (core portion) and an outer shell (shell portion) of a spherical particle are formed from different polymers; and a side-by-side structure in which two or more polymers are disposed alongside each other. Note that the term "core-shell structure" as used in the present disclosure is inclusive of a structure in which a shell portion completely covers an outer surface of a core portion and also of a structure in which a shell portion partially covers an outer surface of a core portion such as illustrated in FIG. 5, for example. In terms of external appearance, even in a situation in which the outer surface of a core portion appears to be completely covered by a shell portion, the shell portion is still considered to be a shell portion that partially covers the outer surface of the core portion so long as pores are formed that pass between inside and outside of the shell portion. Accordingly, a particulate polymer that includes a shell portion having fine pores that pass between an outer surface of the shell portion (i.e., a circumferential surface of the particulate polymer) and an outer surface of a core portion, for example, corresponds to a particulate polymer in which a shell portion partially covers an outer surface of a core portion.

The degree of swelling of the adhesive material in a mixed solvent of ethylene carbonate and diethyl carbonate (volume ratio: ethylene carbonate/diethyl carbonate=3/7) is preferably 110% or more, and is preferably 1500% or less, more preferably 1300% or less, and particularly preferably 1000% or less. When the degree of swelling is not more than any of the upper limits set forth above, permeability of electrolyte solution to a central part of a positive electrode or a negative electrode can be reliably improved.

Note that the degree of swelling of the adhesive material is measured by the following method.

A water dispersion of the adhesive material is dried, and then approximately 0.2 g of the obtained dried material is pressed for 2 minutes under pressing conditions of 200° C. and 5 MPa to obtain a film. The obtained film is cut to a 1 cm square to obtain a test specimen, and the mass W2 (g) of this test specimen is measured. Next, the test specimen is immersed in a mixed solvent of ethylene carbonate and diethyl carbonate at 60° C. for 72 hours. The test specimen is subsequently removed from the mixed solvent of ethylene carbonate and diethyl carbonate, mixed solvent of ethylene carbonate and diethyl carbonate on the surface of the test specimen is wiped off, and the mass W3 (g) of the test specimen is measured. The degree of swelling (%) is then calculated by the following formula.

$$\text{Degree of swelling}(\%)=W3/W2\times 100$$

The adhesive material can be supplied to the affixing surface X and/or Y in any state, such as a solid state, a molten state, a dissolved state in a solvent, or a dispersed state in a solvent. In particular, it is preferable that the adhesive material is supplied in a dissolved state in a solvent or a dispersed state in a solvent, and more preferable that the adhesive material is supplied in a dispersed state in a solvent.

In a case in which the adhesive material is supplied to the affixing surface X and/or Y in a dissolved state in a solvent or a dispersed state in a solvent (i.e., in a case in which a composition for adhesion containing the adhesive material and a solvent is supplied to the affixing surface), the solvent of the composition for adhesion can be water, an organic solvent, or a mixture thereof, for example, without any specific limitations. Examples of organic solvents that can be used include, but are not specifically limited to, alicyclic hydrocarbons such as cyclopentane and cyclohexane; aromatic hydrocarbons such as toluene and xylene; ketones such as ethyl methyl ketone and cyclohexanone; esters such as ethyl acetate, butyl acetate, γ-butyrolactone, and ε-caprolactone; nitriles such as acetonitrile and propionitrile; ethers such as tetrahydrofuran and ethylene glycol diethyl ether; and alcohols such as methanol, ethanol, isopropanol, ethylene glycol, and ethylene glycol monomethyl ether.

Of the examples given above, water and alcohols are preferable as the solvent from a viewpoint of efficiently producing a laminate, and water is more preferable.

Application of the adhesive material using a coating machine (51-54 in FIGS. 6 and 7) described further below can be performed by a known application method such as an inkjet, spraying, dispensing, gravure coating, or screen printing method. Of these application methods, it is preferable that the adhesive material is applied using an inkjet method from a viewpoint of enabling simple adjustment of the amount and range of application of the adhesive material.

The adhesive material is preferably applied to only part of the affixing surface X and/or Y. The adhesive material can be applied such as to have any plan view shape, such as a striped shape, a dotted shape, or a lattice shape, without any specific limitations. Of these shapes, application of the adhesive material with a dotted shape is preferable from a viewpoint of further increasing injectability of electrolyte solution in production of the secondary battery using the laminate and reducing resistance of the secondary battery. Moreover, the dotted adhesive material may be disposed (applied) in an array such as to have a specific pattern such as a striped pattern, a dotted pattern, or a lattice pattern. In particular, it is preferable that the dotted adhesive material is disposed (formed) in a striped array from a viewpoint of further increasing injectability of electrolyte solution in production of the presently disclosed secondary battery and reducing resistance of the secondary battery. Note that in a case in which a fine dotted adhesive material is to be arranged in a specific pattern, it is preferable that the adhesive material is applied by an inkjet method from a viewpoint of ease of application and arrangement of the adhesive material.

The maximum dot diameter in the dotted shape of the adhesive material is preferably 30 μm or more, more preferably 40 μm or more, and particularly preferably 50 μm or more, and is preferably 200 μm or less, more preferably 180 μm or less, and particularly preferably 150 μm or less. When the maximum dot diameter is not less than any of the lower limits set forth above, permeability of electrolyte solution to a central part of a positive electrode or a negative electrode can be reliably improved. Moreover, when the maximum dot diameter is not more than any of the upper limits set forth above, deterioration of cycle characteristics of the secondary battery can be inhibited.

[[Particulate Polymer]]

The particulate polymer having a core-shell structure is a component that functions as a binder in the adhesive material for adhering battery members, such as a separator and an electrode, to each other. By using the particulate polymer having a core-shell structure as a binder, battery members can be strongly adhered to each other via the adhesive material while also increasing electrolyte solution injectability of the secondary battery and causing the secondary battery to display excellent low-temperature output characteristics.

<<Core-Shell Structure>>

The particulate polymer having a core-shell structure includes a core portion and a shell portion that covers an outer surface of the core portion. The shell portion may completely cover the outer surface of the core portion or may partially cover the outer surface of the core portion. In terms of external appearance, even in a situation in which the outer surface of the core portion appears to be completely covered by the shell portion, the shell portion is still considered to be a shell portion that partially covers the outer surface of the core portion so long as pores are formed that pass between inside and outside of the shell portion.

FIG. 5 illustrates the cross-sectional structure of one example of the particulate polymer. A particulate polymer 300 illustrated in FIG. 5 has a core-shell structure including a core portion 310 and a shell portion 320. The core portion 310 is a portion that is further inward than the shell portion 320 in the particulate polymer 300. The shell portion 320 is a portion that covers an outer surface 310S of the core portion 310 and is normally an outermost portion in the particulate polymer 300. In the example illustrated in FIG. 5, the shell portion 320 partially covers the outer surface 310S of the core portion 310 rather than completely covering the outer surface 310S of the core portion 310.

Note that the particulate polymer may include any constituent element other than the core portion and the shell portion described above so long as the expected effects are not significantly lost as a result. Specifically, the particulate polymer may, for example, include a portion inside of the core portion that is formed of a different polymer to the core portion. In one specific example, a residual seed particle may be present inside of the core portion in a situation in which seed particles are used in production of the particulate polymer by seeded polymerization. However, from a viewpoint of more noticeably displaying the expected effects, it is preferable that the particulate polymer is composed of only the core portion and the shell portion.

—Core Portion—

——Glass-Transition Temperature——

The glass-transition temperature of a polymer of the core portion in the particulate polymer is preferably 10° C. or higher, more preferably 40° C. or higher, and particularly preferably 60° C. or higher, and is preferably 200° C. or lower, more preferably 150° C. or lower, and particularly preferably 110° C. or lower. When the glass-transition temperature of the polymer of the core portion is 10° C. or higher, battery members can be more strongly adhered to each other via the adhesive material. On the other hand, when the glass-transition temperature of the polymer of the core portion is 200° C. or lower, polymerization stability of the particulate polymer can be ensured.

Note that the glass-transition temperature of the polymer of the core portion can be adjusted by altering the types and proportions of monomers used to produce the polymer of the core portion, for example.

——Chemical Composition——

Examples of monomers that can be used to form the polymer of the core portion include vinyl chloride monomers such as vinyl chloride and vinylidene chloride; vinyl acetate monomers such as vinyl acetate; aromatic vinyl monomers such as styrene, α-methylstyrene, styrene sulfonic acid, butoxystyrene, and vinylnaphthalene; vinylamine monomers such as vinylamine; vinylamide monomers such as N-vinylformamide and N-vinylacetamide; (meth)acrylic acid ester monomers such as methyl acrylate, ethyl acrylate, butyl acrylate, 2-ethylhexyl acrylate, methyl methacrylate, ethyl methacrylate, butyl methacrylate, and cyclohexyl methacrylate; (meth)acrylamide monomers such as acrylamide and methacrylamide; (meth)acrylonitrile monomers such as acrylonitrile and methacrylonitrile; fluorine-containing (meth)acrylic acid ester monomers such as 2-(perfluorohexyl)ethyl methacrylate and 2-(perfluorobutyl)ethyl acrylate; maleimide; and maleimide derivatives such as phenylmaleimide. One of these monomers may be used individually, or two or more of these monomers may be used in combination in a freely selected ratio.

Note that in the present disclosure, "(meth)acryl" is used to indicate "acryl" and/or "methacryl", whereas "(meth)acrylonitrile" is used to indicate "acrylonitrile" and/or "methacrylonitrile".

Of these monomers, the use of either or both of an aromatic vinyl monomer and a (meth)acrylic acid ester monomer as monomers used to produce the polymer of the core portion is preferable from a viewpoint of more strongly adhering battery members to each other via the adhesive material, with the use of both an aromatic vinyl monomer and a (meth)acrylic acid ester monomer being more preferable. In other words, the polymer of the core portion preferably includes either or both of an aromatic vinyl monomer unit and a (meth)acrylic acid ester monomer unit, and more preferably includes both an aromatic vinyl monomer unit and a (meth)acrylic acid ester monomer unit.

The phrase "includes a monomer unit" as used in the present disclosure means that "a polymer obtained with the monomer includes a repeating unit derived from the monomer".

The proportion constituted by an aromatic vinyl monomer unit in the polymer of the core portion when all repeating units (all monomer units) included in the polymer of the core portion are taken to be 100 mass % is, from a viewpoint of even more strongly adhering battery members to each other via the adhesive material, preferably 50 mass % or more, more preferably 60 mass % or more, and particularly preferably 75 mass % or more, and is preferably 95 mass % or less, and more preferably 90 mass % or less.

Moreover, the proportion constituted by a (meth)acrylic acid ester monomer unit in the polymer of the core portion when all repeating units (all monomer units) included in the polymer of the core portion are taken to be 100 mass % is, from a viewpoint of even more strongly adhering battery members to each other via the adhesive material, preferably 2 mass % or more, more preferably 3 mass % or more, and particularly preferably 4 mass % or more, and is preferably 20 mass % or less, more preferably 15 mass % or less, and particularly preferably 10 mass % or less.

The polymer of the core portion can also include an acid group-containing monomer unit. Examples of acid group-containing monomers include monomers that include an acid group such as carboxy group-containing monomers, sulfo group-containing monomers, and phosphate group-containing monomers.

Moreover, examples of carboxy group-containing monomers include monocarboxylic acids and dicarboxylic acids. Examples of monocarboxylic acids include acrylic acid, methacrylic acid, and crotonic acid. Examples of dicarboxylic acids include maleic acid, fumaric acid, and itaconic acid.

Examples of sulfo group-containing monomers include vinyl sulfonic acid, methyl vinyl sulfonic acid, (meth)allyl sulfonic acid, (meth)acrylic acid 2-sulfoethyl, 2-acrylamido-2-methylpropane sulfonic acid, and 3-allyloxy-2-hydroxypropane sulfonic acid.

Examples of phosphate group-containing monomers include 2-(meth)acryloyloxyethyl phosphate, methyl-2-(meth)acryloyloxyethyl phosphate, and ethyl-(meth)acryloyloxyethyl phosphate.

Note that in the present disclosure, "(meth)allyl" is used to indicate "allyl" and/or "methallyl", whereas "(meth)acryloyl" is used to indicate "acryloyl" and/or "methacryloyl".

Of these acid group-containing monomers, carboxy group-containing monomers are preferable, of which, monocarboxylic acids are preferable, and (meth)acrylic acid is more preferable.

One acid group-containing monomer may be used individually, or two or more acid group-containing monomers may be used in combination in a freely selected ratio.

The proportion constituted by an acid group-containing monomer unit in the polymer of the core portion when all repeating units (all monomer units) included in the polymer of the core portion are taken to be 100 mass % is preferably 0.1 mass % or more, and more preferably 1 mass % or more, and is preferably 15 mass % or less, and more preferably 10 mass % or less. By setting the proportion constituted by an acid group-containing monomer unit within any of the ranges set forth above, dispersibility of the polymer of the core portion can be increased in production of the particulate polymer, which facilitates formation of a shell portion partially covering the outer surface of the core portion with respect to the outer surface of the polymer of the core portion.

The polymer of the core portion may also include a hydroxy group-containing monomer unit.

Examples of hydroxy group-containing monomers that can form a hydroxy group-containing monomer unit include 2-hydroxyethyl acrylate, 2-hydroxypropyl acrylate, 2-hydroxyethyl methacrylate, and 2-hydroxypropyl methacrylate. One of these hydroxy group-containing monomers may be used individually, or two or more of these hydroxy group-containing monomers may be used in combination in a freely selected ratio.

The proportion constituted by a hydroxy group-containing monomer unit in the polymer of the core portion when all repeating units (all monomer units) included in the polymer of the core portion are taken to be 100 mass % is preferably 0.1 mass % or more, and more preferably 1 mass % or more, and is preferably 15 mass % or less, and more preferably 10 mass % or less. By setting the proportion constituted by a hydroxy group-containing monomer unit within any of the ranges set forth above, dispersibility of the polymer of the core portion can be increased in production of the particulate polymer, which facilitates formation of a shell portion partially covering the outer surface of the core portion with respect to the outer surface of the polymer of the core portion.

The polymer of the core portion preferably includes a cross-linkable monomer unit in addition to the monomer units described above. A cross-linkable monomer is a monomer that can form a cross-linked structure during or after polymerization by heating or by irradiation with energy rays.

Examples of cross-linkable monomers that can be used include polyfunctional monomers having at least two groups that display polymerization reactivity in the monomer. Examples of such polyfunctional monomers include divinyl monomers such as divinylbenzene, 1,3-butadiene, isoprene, and allyl methacrylate; di(meth)acrylic acid ester monomers such as ethylene dimethacrylate, diethylene glycol dimethacrylate, ethylene glycol dimethacrylate, diethylene glycol diacrylate, and 1,3-butylene glycol diacrylate; tri(meth)acrylic acid ester monomers such as trimethylolpropane trimethacrylate and trimethylolpropane triacrylate; ethylenically unsaturated monomers that include an epoxy group such as allyl glycidyl ether and glycidyl methacrylate; and γ-methacryloxypropyltrimethoxysilane. Of these cross-linkable monomers, di(meth)acrylic acid ester monomers are more preferable. One of these cross-linkable monomers may be used individually, or two or more of these cross-linkable monomers may be used in combination in a freely selected ratio.

The proportion constituted by a cross-linkable monomer unit in the polymer of the core portion when all repeating units (all monomer units) included in the polymer of the core portion are taken to be 100 mass % is preferably 0.1 mass % or more, more preferably 0.2 mass % or more, and particularly preferably 0.5 mass % or more, and is preferably 10 mass % or less, more preferably 5 mass % or less, and particularly preferably 3 mass % or less. By setting the proportion constituted by a cross-linkable monomer unit within any of the ranges set forth above, battery members can be even more strongly adhered to each other via the adhesive material.

—Shell Portion—

——Glass-Transition Temperature——

The glass-transition temperature of a polymer of the shell portion in the particulate polymer is preferably −50° C. or higher, more preferably −45° C. or higher, and particularly preferably −40° C. or higher, and is preferably 60° C. or lower, more preferably 50° C. or lower, particularly preferably 40° C. or lower, and particularly preferably 0° C. or lower. When the glass-transition temperature of the polymer of the shell portion is −50° C. or higher, low-temperature output characteristics of the secondary battery can be improved. On the other hand, when the glass-transition temperature of the polymer of the shell portion is 60° C. or lower, battery members can be more strongly adhered to each other via the adhesive material.

Note that the glass-transition temperature of the polymer of the shell portion can be adjusted by altering the types and proportions of monomers used to produce the polymer of the shell portion, for example.

The glass-transition temperature of the polymer of the shell portion is preferably at least 10° C. lower than the previously described glass-transition temperature of the polymer of the core portion, more preferably at least 30° C. lower than the glass-transition temperature of the polymer of the core portion, and particularly preferably at least 50° C. lower than the glass-transition temperature of the polymer of the core portion from a viewpoint of more strongly adhering battery members to each other via the adhesive material.

——Chemical Composition——

Examples of monomers that can be used to produce the polymer of the shell portion include the same monomers as listed as examples of monomers that can be used to produce the polymer of the core portion. One of such monomers may be used individually, or two or more of such monomers may be used in combination in a freely selected ratio.

Of these monomers, the use of either or both of a (meth)acrylic acid ester monomer and an aromatic vinyl monomer as monomers used to produce the polymer of the shell portion is preferable from a viewpoint of more strongly adhering battery members to each other via the adhesive material, with the use of both a (meth)acrylic acid ester monomer and an aromatic vinyl monomer being more preferable. In other words, the polymer of the shell portion preferably includes either or both of a (meth)acrylic acid ester monomer unit and an aromatic vinyl monomer unit, and more preferably includes both a (meth)acrylic acid ester monomer unit and an aromatic vinyl monomer unit.

The proportion constituted by a (meth)acrylic acid ester monomer unit in the polymer of the shell portion when all repeating units (all monomer units) included in the polymer of the shell portion are taken to be 100 mass % is, from a viewpoint of even more strongly adhering battery members to each other via the adhesive material, preferably 10 mass % or more, more preferably 30 mass % or more, and particularly preferably 50 mass % or more, and is preferably 95 mass % or less, more preferably 90 mass % or less, and particularly preferably 85 mass % or less.

Moreover, the proportion constituted by an aromatic vinyl monomer unit in the polymer of the shell portion when all repeating units (all monomer units) included in the polymer of the shell portion are taken to be 100 mass % is, from a viewpoint of even more strongly adhering battery members to each other via the adhesive material, preferably 5 mass % or more, preferably 10 mass % or more, and particularly preferably 15 mass % or more, and is preferably 40 mass % or less, more preferably 30 mass % or less, and particularly preferably 25 mass % or less.

Besides a (meth)acrylic acid ester monomer unit and an aromatic vinyl monomer unit, the polymer of the shell portion can include an acid group-containing monomer unit. Examples of acid group-containing monomers include monomers that include an acid group such as carboxy group-containing monomers, sulfo group-containing monomers, and phosphate group-containing monomers. Specifically, examples of acid group-containing monomers that can be used include the same monomers as the acid group-containing monomers that can be used to form the core portion.

Of these acid group-containing monomers, carboxy group-containing monomers are preferable, of which, monocarboxylic acids are more preferable, and (meth)acrylic acid is even more preferable.

One acid group-containing monomer may be used individually, or two or more acid group-containing monomers may be used in combination in a freely selected ratio.

The proportion constituted by an acid group-containing monomer unit in the polymer of the shell portion when all repeating units (all monomer units) included in the polymer of the shell portion are taken to be 100 mass % is preferably 0.1 mass % or more, more preferably 0.4 mass % or more, and particularly preferably 0.7 mass % or more, and is preferably 15 mass % or less, more preferably 10 mass % or less, and particularly preferably 5 mass % or less. By setting the proportion constituted by an acid group-containing monomer unit within any of the ranges set forth above, dispersibility of the particulate polymer can be improved, and battery members can be even more strongly adhered to each other via the adhesive material.

The polymer of the shell portion may also include a hydroxy group-containing monomer unit.

Examples of hydroxy group-containing monomers that can form a hydroxy group-containing monomer unit of the polymer of the shell portion include the same monomers as the hydroxy group-containing monomers that can be used to form the core portion.

The proportion constituted by a hydroxy group-containing monomer unit in the polymer of the shell portion when all repeating units (all monomer units) included in the polymer of the shell portion are taken to be 100 mass % is preferably 0.1 mass % or more, more preferably 0.4 mass % or more, and particularly preferably 0.7 mass % or more, and is preferably 15 mass % or less, more preferably 10 mass % or less, and particularly preferably 5 mass % or less. By setting the proportion constituted by a hydroxy group-containing monomer unit within any of the ranges set forth above, dispersibility of the particulate polymer can be improved, and battery members can be even more strongly adhered to each other via the adhesive material.

The polymer of the shell portion can also include a cross-linkable monomer unit. Examples of cross-linkable monomers that can be used include the same monomers as given as examples of cross-linkable monomers that can be used for the polymer of the core portion. Of these cross-linkable monomers, di(meth)acrylic acid ester monomers and allyl methacrylate are preferable. One cross-linkable monomer may be used individually, or two or more cross-linkable monomers may be used in combination in a freely selected ratio.

The proportion constituted by a cross-linkable monomer unit in the polymer of the shell portion when all repeating units (all monomer units) included in the polymer of the shell portion are taken to be 100 mass % is preferably 0.05 mass % or more, more preferably 0.1 mass % or more, and particularly preferably 0.2 mass % or more, and is preferably 4 mass % or less, more preferably 3 mass % or less, and particularly preferably 2 mass % or less.

—Production Method of Particulate Polymer—

The particulate polymer having the core-shell structure described above can be produced by, for example, performing stepwise polymerization in which monomers for forming the polymer of the core portion and monomers for forming the polymer of the shell portion are used and in which the ratio of these monomers is changed over time. Specifically, the particulate polymer can be produced by continuous, multi-step emulsion polymerization or multi-step suspension polymerization in which a polymer of a preceding step is then covered by a polymer of a subsequent step.

The following describes one example of a case in which the particulate polymer having the core-shell structure described above is obtained by multi-step emulsion polymerization.

In the polymerization, an anionic surfactant such as sodium dodecylbenzenesulfonate or sodium dodecyl sulfate, a non-ionic surfactant such as polyoxyethylene nonylphenyl ether or sorbitan monolaurate, or a cationic surfactant such as octadecylamine acetate may be used as an emulsifier in accordance with a standard method. Moreover, a peroxide such as t-butyl peroxy-2-ethylhexanoate, potassium persulfate, or cumene peroxide, or an azo compound such as 2,2'-azobis(2-methyl-N-(2-hydroxyethyl)-propionamide) or 2,2'-azobis(2-amidinopropane) hydrochloride may be used as a polymerization initiator.

The polymerization procedure involves initially mixing monomers for forming the core portion and the emulsifier, and performing emulsion polymerization as one batch to obtain a particulate polymer that forms the core portion. The particulate polymer having the core-shell structure set forth above can then be obtained by performing polymerization of monomers for forming the shell portion in the presence of the particulate polymer forming the core portion.

In a case in which a particulate polymer in which the outer surface of a core portion is partially covered by a shell portion is to be produced, it is preferable that the monomers for forming the polymer of the shell portion are supplied into the polymerization system continuously or divided into a plurality of portions. As a result of the monomers for forming the polymer of the shell portion being supplied into the polymerization system in portions or continuously, the polymer forming the shell portion can be formed as particles that bond to the core portion such as to form a shell portion that partially covers the core portion.

<<Production Method of Laminate>>

A method of producing the laminate in the presently disclosed secondary battery includes a step (A) of producing an affixed body and a step (B) of cutting the affixed body and, in a case in which the affixed body produced in the step (A) does not include a positive electrode, may optionally further include a step (C) of affixing a positive electrode to a cut body obtained through cutting of the affixed body in the step (B).

[Step (A)]

The affixed body produced in the step (A) may be (I) or (II) described below.

(I) An affixed body (hereinafter, also referred to as "affixed body (I)") that includes an elongated negative electrode web or a negative electrode (hereinafter, the "negative electrode web or negative electrode" is also referred to as a "negative electrode material"), an elongated first separator web affixed to one surface of the negative electrode material, and an elongated second separator web affixed to the other surface of the negative electrode material, and optionally includes a positive electrode affixed to a surface of the first separator web at the opposite side thereof to the negative electrode material (II) An affixed body (hereinafter, also referred to as "affixed body (II)") that includes a negative electrode material formed of an elongated negative electrode web, an elongated first separator web, a positive electrode, and an elongated second separator web affixed in stated order In the method of producing the laminate in the presently disclosed secondary battery, a laminate that includes a negative electrode, a first separator affixed to one surface of the negative electrode, a positive electrode affixed to a surface of the first separator at the opposite side thereof to the negative electrode, and a second separator affixed to the other surface of the negative electrode such as illustrated in FIGS. 1A and 1B, for example, is normally obtained in a case in which the affixed body (I) is produced in the step (A).

Also note that in a case in which the affixed body (I) does not include a positive electrode, the step (C) is normally performed after the step (B) to produce a laminate in the method of producing the laminate in the presently disclosed secondary battery.

Moreover, in the method of producing the laminate in the presently disclosed secondary battery, a laminate that includes a negative electrode, a first separator affixed to one surface of the negative electrode, a positive electrode affixed to a surface of the first separator at the opposite side thereof to the negative electrode, and a second separator affixed to a surface of the positive electrode at the opposite side thereof to the first separator such as illustrated in FIG. 3, for example, is normally obtained in a case in which the affixed body (II) is produced in the step (A).

Production of an affixed body in the step (A) is normally carried out by applying an adhesive material at an affixing surface of members that are to be affixed to each other, and then affixing members of the affixed body to each other via the adhesive material. In other words, the step (A) includes a step (a1) of applying an adhesive material at an affixing surface Y of a negative electrode material and a separator web that is to be affixed to the negative electrode material and can further include a step (a2) of applying an adhesive material at an affixing surface X of a separator web and a positive electrode.

Note that the "separator web that is to be affixed to the negative electrode material" is a first separator web and a second separator web in a case in which the affixed body that is to be produced is the affixed body (I) and is a first separator web in a case in which the affixed body that is to be produced is the affixed body (II). Moreover, the member onto which the adhesive material is applied may be just one of the members that are to be affixed to each other or may be both of the members that are to be affixed to each other.

Figure 6:
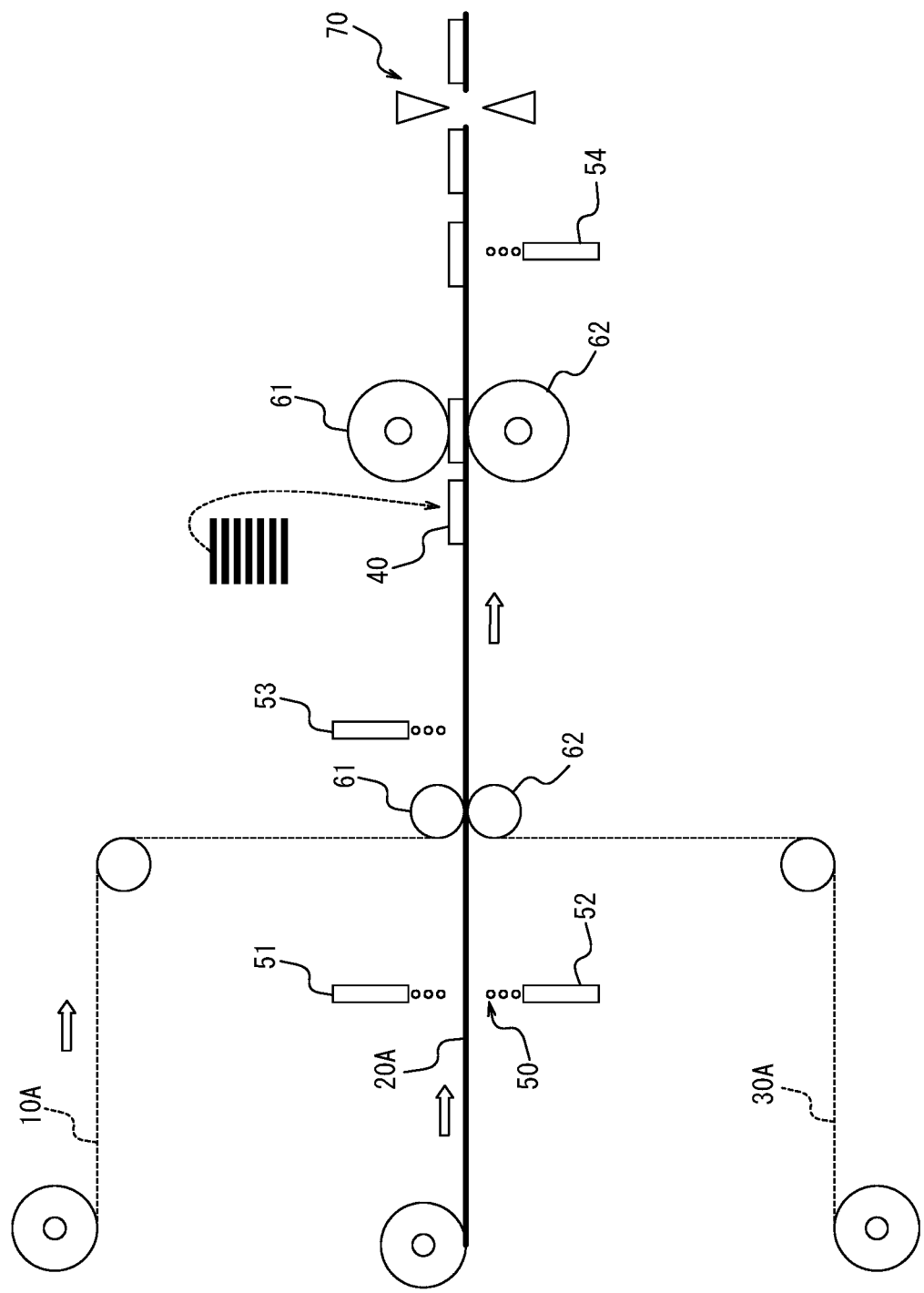
FIG. 6 is an explanatory diagram illustrating one example of a production process of a laminate in a presently disclosed secondary battery.

Specifically, the affixed body (I) can be produced as illustrated in FIG. 6, for example, in the step (A).

In FIG. 6, an elongated first separator web 10A that has been fed from a first separator web roll is affixed to one surface of a negative electrode material formed of an elongated negative electrode web 20A that has been fed from a negative electrode web roll via an adhesive material that has been supplied from a coating machine 51, and an elongated second separator web 30A that has been fed from a second separator web roll is affixed to the other surface of the negative electrode material formed of the negative electrode web 20A via an adhesive material that has been supplied from a coating machine 52. Note that the affixing can be performed using pressure bonding rollers 61 and 62, for example. Positive electrodes 40 are affixed at a specific arrangement pitch to a surface of the first separator web 10A at the opposite side thereof to the negative electrode web 20A via an adhesive material that has been supplied from a coating machine 53, and, in this manner, an affixed body (I) that includes a positive electrode is obtained.

Note that in FIG. 6, an adhesive material is supplied from a coating machine 54 to a surface of the second separator web 30A at the opposite side thereof to the negative electrode web 20A so that when laminates obtained by cutting the affixed body between positive electrodes 40 that are adjacent in the longitudinal direction are stacked in order to produce a stack, the laminates can be well adhered to each other.

Figure 7:
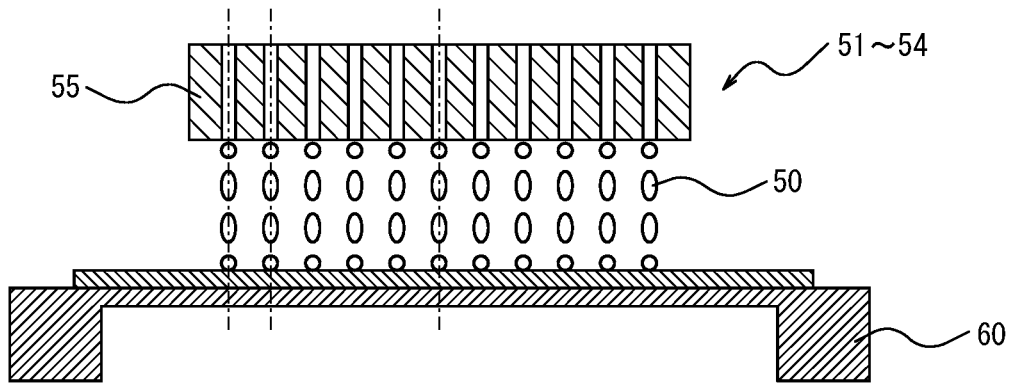
FIG. 7 is an explanatory diagram illustrating one example of a coating machine (nozzle head) illustrated in FIG. 6.

FIG. 7 is an explanatory diagram illustrating one example of a coating machine (nozzle head) illustrated in FIG. 6.

In FIG. 7, droplets 50 of an adhesive material are applied onto a substrate 60 via nozzles 55 of a coating machine 51-54.

Note that the method by which an affixed body is produced in the step (A) is not limited to the example described above. For example, the coating machine 54 may supply an adhesive material to a cut body obtained after cutting of the affixed body in FIG. 6.

[[Negative Electrode Material and Positive Electrode]]

An electrode that is obtained by cutting an elongated electrode web (negative electrode web or positive electrode web) can be used as an electrode (negative electrode or positive electrode) without any specific limitations. Moreover, an electrode web that is formed of an electrode substrate having an electrode mixed material layer (negative electrode mixed material layer or positive electrode mixed material layer) formed at one surface or both surfaces of an elongated current collector or an electrode web that has a porous membrane layer further formed on an electrode mixed material layer of an electrode substrate can be used as an electrode web (negative electrode web or positive electrode web).

Note that any current collector, electrode mixed material layer, and porous membrane layer that can be used in the field of secondary batteries, such as any of those described in JP2013-145763A, for example, can be used as the current collector, electrode mixed material layer, and porous membrane layer without any specific limitations. The porous membrane layer is a layer that contains non-conductive particles such as described in JP2013-145763A, for example.

[[Separator Web]]

A separator web that is formed of an elongated separator substrate or a separator web that has a porous membrane layer formed at one surface or both surfaces of an elongated separator substrate can, for example, be used as a separator web without any specific limitations.

Note that any separator substrate and porous membrane layer that can be used in the field of secondary batteries, such as any of those described in JP2012-204303A and JP2013-145763A, for example, can be used as the separator substrate and the porous membrane layer without any specific limitations.

In the step (a1) in which an adhesive material is applied at an affixing surface Y with a separator web that is to be affixed to the negative electrode material or in the step (a2) in which an adhesive material is applied at an affixing surface X with a separator web that is to be affixed to the positive electrode, the adhesive material is applied at a surface Z, which is either or both of the affixing surfaces X and Y, such that a first coated section where the adhesive material is applied with a coating weight B is located as an outer region Q and such that a second coated section where the adhesive material is applied with a coating weight A that is at least 0.02 g/m$^2$ less than the coating weight B is located as an inner region P.

—First Coated Section—

The first coated section is a section corresponding to the outer region Q. In the first coated section, the adhesive material is applied with the coating weight B.

Note that although a region where the adhesive material is not applied may be present in the first coated section, the coating weight B of the adhesive material is calculated in a manner that includes the region where the adhesive material is not applied (coating weight B of adhesive material=total mass of adhesive material applied in outer region Q (g)/area of entire outer region Q (m$^2$)).

In a case in which the adhesive material is applied in a dotted shape, the average thickness of dots formed in the first coated section is preferably not less than 0.2 μm and not more than 1.0 μm, and more preferably not less than 0.5 μm and not more than 1.0 μm.

Moreover, in a case in which the adhesive material is applied in a dotted shape, the arrangement pitch of dots formed in a coated region of the first coated section (i.e., the distance between centers of the dots in plan view) is preferably not less than 100 μm and not more than 1,000 μm, and more preferably not less than 100 μm and not more than 200 μm.

—Second Coated Section—

The second coated section is a section corresponding to the inner region P. In the second coated section, the adhesive material is applied with the coating weight A.

Note that although a region where the adhesive material is not applied may be present in the second coated section, the coating weight A of the adhesive material is calculated in a manner that includes the region where the adhesive material is not applied (coating weight A of adhesive material=total mass of adhesive material applied in inner region P (g)/area of entire inner region P (m$^2$)).

In a case in which the adhesive material is applied in a dotted shape, the average thickness of dots formed in the second coated section is preferably not less than 0.2 μm and not more than 1.0 μm.

Moreover, in a case in which the adhesive material is applied in a dotted shape, the arrangement pitch of dots formed in a coated region of the second coated section (i.e., the distance between centers of the dots in plan view) is preferably not less than 100 μm and not more than 1,000 μm, and more preferably not less than 300 μm and not more than 400 μm.

In the step (a2), an adhesive material is applied at an affixing surface of a separator web and a positive electrode.

Specifically, an adhesive material is applied at an affixing surface of a separator web and a positive electrode in the step (a2) in a case in which an affixed body including a positive electrode is to be produced in the step (A) (for example, FIG. 6) and in a case in which an affixed body having an adhesive material pre-applied at a position where a positive electrode is to be affixed after cutting (affixed body not including a positive electrode) is to be produced in the step (A).

Specifically, in FIG. 6, for example, an adhesive material is applied from the coating machine 53 to an affixing surface of the first separator web 10A and the positive electrode 40.

Note that in the step (A), an adhesive material may be supplied to one surface of the affixed body as illustrated in FIG. 6 (surface of second separator web 30A at opposite side thereof to negative electrode web 20A in FIG. 6), for example, in order to enable good adhesion of laminates to each other when laminates are stacked to produce a stack.

[Step (B)]

In the step (B), the affixed body is cut using a cutting machine 70. Note that in a case in which an affixed body that includes a positive electrode is cut in the step (B), the resultant cut bodies are each a laminate.

The cutting machine 70 can be any cutting machine that can be used in the field of secondary battery production, such as a cutting machine that cuts the affixed body by sandwiching the affixed body with cutting blades from both sides in a thickness direction of the affixed body.

In the step (B) implemented after the step (A), the affixed body can be well cut while also inhibiting curling of a separator from a negative electrode as previously described.

[Step (C)]

In the step (C) that is optionally implemented, a positive electrode is affixed to a cut body obtained through cutting of the affixed body in the step (B) to obtain a laminate in a case in which an affixed body that does not include a positive electrode has been cut in the step (B).

<Electrolyte Solution>

An organic electrolyte solution in which a supporting electrolyte is dissolved in an organic solvent is normally used as an electrolyte solution. A lithium salt can be used as the supporting electrolyte in a case in which the secondary battery is a lithium ion secondary battery, for example. Examples of lithium salts that can be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$.

Of these lithium salts, $LiPF_6$, $LiClO_4$, and $CF_3SO_3Li$ are preferable because they readily dissolve in solvents and exhibit a high degree of dissociation, with $LiPF_6$ being particularly preferable. One electrolyte may be used individually, or two or more electrolytes may be used in combination in a freely selected ratio. In general, lithium ion conductivity tends to increase when a supporting electrolyte having a high degree of dissociation is used. Therefore, lithium ion conductivity can be adjusted through the type of supporting electrolyte that is used.

The organic solvent used in the electrolyte solution is not specifically limited so long as the supporting electrolyte can dissolve therein. Examples of suitable organic solvents include carbonates such as dimethyl carbonate (DMC), ethylene carbonate (EC), diethyl carbonate (DEC), propylene carbonate (PC), butylene carbonate (BC), ethyl methyl carbonate (EMC), and vinylene carbonate (VC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of such solvents may be used. Of these solvents, carbonates are preferable due to having high permittivity and a wide stable potential region.

In general, lithium ion conductivity tends to increase when a solvent having a low viscosity is used. Therefore, lithium ion conductivity can be adjusted through the type of solvent that is used.

The concentration of the electrolyte in the electrolyte solution may be adjusted as appropriate. Furthermore, known additives may be added to the electrolyte solution.

The presently disclosed secondary battery can be produced by, for example, performing rolling, folding, or the like, in accordance with the battery shape, with respect to a stack obtained through stacking of laminates, as necessary, to place the stack in a device container (battery container), injecting the electrolyte solution into the device container, and sealing the device container. Note that the stack may be a laminate used in that form or may be produced through stacking of a plurality of laminates. Moreover, the stack may be produced by stacking a laminate and an additional battery member (for example, an electrode and/or a separator). In order to prevent internal pressure increase and occurrence of overcharging or overdischarging, an overcurrent preventing device such as a fuse or a PTC device, an expanded metal, a lead plate, or the like may be provided in the presently disclosed secondary battery as necessary. The shape of the secondary battery may be a coin type, button type, sheet type, cylinder type, prismatic type, flat type, or the like.

(Method of Producing Secondary Battery)

The presently disclosed method of producing a secondary battery is a method of producing the secondary battery set forth above and includes a first application step, a second application step, and other optional steps.

Note that the "first application step" and the "second application step" may be performed at the same time or may be performed separately.

<First Application Step>

The first application step is a step of applying an adhesive material with a first application amount in a first region at a surface Z.

<Second Application Step>

The second application step is a step of applying an adhesive material with a second application amount in a second region disposed further inward than the first region at the surface Z.

The first application amount is required to be more than the second application amount. Through the first application amount being more than the second application amount in this manner, it is possible to efficiently produce a secondary battery that can improve permeability of electrolyte solution to a central part of a positive electrode or a negative electrode.

The area of the second region relative to the area of the surface Z is preferably 10% or more, more preferably 30% or more, and particularly preferably 50% or more, and is preferably 80% or less, and more preferably 70% or less. When the area of the second region is not less than any of the lower limits set forth above, permeability of electrolyte solution to a central part of a positive electrode or a negative electrode can be reliably improved. Moreover, when the area of the second region is not more than any of the upper limits set forth above, sufficient adhesive strength of an electrode and a separator can be ensured.

The coating weight D of the adhesive material in the first region is preferably 0.05 $g/m^2$ or more, and is preferably 0.30 g/m² or less, more preferably 0.20 g/m² or less, and particularly preferably 0.15 g/m² or less. When the coating weight D is not less than the lower limit set forth above, sufficient adhesive strength of an electrode and a separator can be ensured. Moreover, when the coating weight D is not more than any of the upper limits set forth above, the lithium deposition rate on a negative electrode can be reduced.

The coating weight E of the adhesive material in the second region is preferably 0 g/m² or more, and is preferably 0.15 g/m² or less, more preferably 0.10 g/m² or less, and particularly preferably 0.05 g/m² or less. When the coating weight E is not more than any of the upper limits set forth above, sufficient adhesive strength can be ensured while also reliably improving permeability of electrolyte solution to a central part of a positive electrode or a negative electrode.

The presently disclosed secondary battery can be obtained through the first application step and the second application step described above.

<Other Steps>

Examples of other steps include an assembly step and the like.

<<Assembly Step>>

The assembly step is a step in which a laminate and electrolyte solution are used to assemble a secondary battery and may, for example, be a step in which a secondary battery is assembled by further stacking additional battery members (for example, an electrode and/or a separator), as necessary, with a stack that has been obtained by stacking laminates, subsequently placing the resultant laminate in a battery container, injecting electrolyte solution into the battery container, and sealing the battery container.

EXAMPLES

The following provides a more specific description of the present disclosure based on examples. However, the present disclosure is not limited to the following examples. In the following description, "%" and "parts" used in expressing quantities are by mass, unless otherwise specified.

Moreover, in the case of a polymer that is produced through copolymerization of a plurality of types of monomers, the proportion in the polymer constituted by a monomer unit that is formed through polymerization of a given monomer is normally, unless otherwise specified, the same as the ratio (charging ratio) of the given monomer among all monomers used in polymerization of the polymer.

In the examples and comparative example, the following methods were used to measure and evaluate the shape of an adhesive material, the coating weight in a coated region, the dry adhesive strength of an electrode and a separator, the electrolyte solution injectability of a secondary battery, the cycle characteristics of a secondary battery, and the lithium deposition rate on a negative electrode.

<Shape of Adhesive Material>

The shape of an adhesive material was observed using a laser microscope (VR-3100 produced by Keyence Corporation).

<Coating Weight in Coated Region>

The mass difference per unit area between before and after supply of a composition for adhesion was measured for a range where the composition for adhesion was supplied in order to determine the coating weight.

<Dry Adhesive Strength of Electrode and Separator>

A laminate obtained after affixing a negative electrode having an adhesive material formed at one surface and a separator under the same conditions as in each example or comparative example (i.e., a laminate in which one negative electrode and one separator were affixed via an adhesive material) was sampled to obtain a test specimen.

The test specimen was placed with the surface at the current collector side of the negative electrode facing downward, and cellophane tape was affixed to the surface at the current collector side of the negative electrode. Tape prescribed by JIS Z1522 was used as the cellophane tape. Moreover, the cellophane tape was secured to a horizontal test stage in advance. The stress when the separator was peeled off by pulling one end of the separator vertically upward at a pulling speed of 50 mm/min was measured.

A total of 6 measurements were made in this manner, an average value of the stress was determined as the peel strength, and adhesiveness of the negative electrode and the separator was evaluated by the following standard. A larger peel strength indicates higher adhesiveness.

A: Peel strength of 1.5 N/m or more
B: Peel strength of not less than 1.0 N/m and less than 1.5 N/m
C: Peel strength of not less than 0.5 N/m and less than 1.0 N/m
D: Peel strength of less than 0.5 N/m <Electrolyte Solution Injectability of Secondary Battery>

A produced laminate was enclosed in an aluminum packing case serving as a battery case, and electrolyte solution (solvent: ethylene carbonate/diethyl carbonate/vinylene carbonate=68.5/30/1.5 (volume ratio); electrolyte: $LiPF_6$ of 1 M in concentration) was injected such that no air remained. This was performed with various different injection times.

The minimum injection time for which spillage of the electrolyte solution during injection did not occur was determined and was evaluated by the following standard. A shorter minimum injection time indicates better electrolyte solution injectability.

A: Minimum injection time of less than 100 s
B: Minimum injection time of not less than 100 s and less than 300 s
C: Minimum injection time of not less than 300 s and less than 500 s
D: Minimum injection time of 500 s or more <Cycle Characteristics of Secondary Battery>

A lithium ion secondary battery produced in each example or comparative example was left at rest at a temperature of 25° C. for 5 hours after injection of electrolyte solution. Next, the lithium ion secondary battery was charged to a cell voltage of 3.65 V by a 0.2 C constant-current method at a temperature of 25° C. and was then subjected to 12 hours of aging at a temperature of 60° C. The lithium ion secondary battery was subsequently discharged to a cell voltage of 3.00 V by a 0.2 C constant-current method at a temperature of 25° C. Thereafter, CC-CV charging of the lithium ion secondary battery was performed by a 0.2 C constant-current method (upper limit cell voltage: 4.30 V) and CC discharging of the lithium ion secondary battery was performed to 3.00 V by a 0.2 C constant-current method.

Thereafter, the lithium ion secondary battery was subjected to 100 cycles of a charge/discharge operation between cell voltages of 4.30 V and 3.00 V with a 1.0 C charge/discharge rate in an environment having a temperature of 25° C. The capacity of the $1^{st}$ cycle (i.e., the initial discharge capacity X1) and the discharge capacity X2 of the $100^{th}$ cycle were measured, and a capacity maintenance rate (%) (=(X2/X1)×100) was calculated and was evaluated by the following standard. A larger value for the capacity maintenance rate indicates that the secondary battery has better cycle characteristics.

A: Capacity maintenance rate of 90% or more

B: Capacity maintenance rate of not less than 85% and less than 90%

C: Capacity maintenance rate of not less than 80% and less than 85%

D: Capacity maintenance rate of less than 80%

<Lithium Deposition Rate on Negative Electrode>

A produced lithium ion secondary battery was fully charged to a state of charge (SOC) of 100% with a 1 C constant current in an environment having a temperature of −10° C. The fully charged secondary battery was then dismantled to remove a negative electrode, and the state of the surface of a negative electrode mixed material layer of the negative electrode was observed. The area of lithium deposited at the surface of the negative electrode mixed material layer was measured, and the lithium deposition rate on the negative electrode (=(area of deposited lithium/area of surface of negative electrode mixed material layer)×100 (%)) was calculated. The lithium deposition rate was evaluated by the following standard. A smaller lithium deposition rate is better for a secondary battery.

A: Lithium deposition rate of less than 10%

B: Lithium deposition rate of not less than 10% and less than 20%

C: Lithium deposition rate of 20% or more

Example 1

<Preparation of Adhesive Material>

[Production of Particulate Polymer Having Core-Shell Structure]

First, in core portion formation, 88 parts of styrene as an aromatic vinyl monomer, 6 parts of n-butyl acrylate as a (meth)acrylic acid ester monomer, 5 parts of methacrylic acid as an acid group-containing monomer, 1 part of ethylene glycol dimethacrylate as a cross-linkable monomer, 1 part of sodium dodecylbenzenesulfonate as an emulsifier, 150 parts of deionized water, and 0.5 parts of potassium persulfate as a polymerization initiator were loaded into a 5 MPa pressure-resistant vessel equipped with a stirrer, were sufficiently stirred, and were then heated to 60° C. to initiate polymerization. At the point at which the polymerization conversion rate reached 96%, 80.7 parts of n-butyl acrylate as a (meth)acrylic acid ester monomer, 1 part of methacrylic acid, 18 parts of styrene as an aromatic vinyl monomer, and 0.3 parts of allyl methacrylate as a cross-linkable monomer were continuously added for shell portion formation, heating was performed to 70° C., and polymerization was continued. At the point at which the polymerization conversion rate reached 96%, the reaction was quenched by cooling to produce a water dispersion containing a particulate polymer.

[Production of Other Binder]

A reactor equipped with a stirrer was charged with 70 parts of deionized water, 0.15 parts of sodium lauryl sulfate (produced by Kao Corporation; product name: EMAL 2F) as an emulsifier, and 0.5 parts of ammonium persulfate, the gas phase was purged with nitrogen gas, and heating was performed to 60° C.

Meanwhile, a monomer mixture was obtained in a separate vessel by mixing 50 parts of deionized water, 0.5 parts of sodium dodecylbenzenesulfonate as an emulsifier, and 94 parts of n-butyl acrylate, 2 parts of acrylonitrile, 2 parts of methacrylic acid, 1 part of N-hydroxymethylacrylamide, and 1 part of allyl glycidyl ether as polymerizable monomers. The monomer mixture was continuously added to the aforementioned reactor over 4 hours to carry out polymerization. The reaction was carried out at 60° C. during this addition. Once the addition was completed, stirring was carried out at 70° C. for a further 3 hours to complete the reaction and produce a water dispersion containing an acrylic polymer (other binder).

<Production of Composition for Adhesion>

Inside a stirring vessel, 87 parts in terms of solid content of the water dispersion of the particulate polymer and 13 parts in terms of solid content of the water dispersion of the acrylic polymer (14.9 parts per 100 parts of particulate polymer) were mixed. Next, 87 parts of propylene glycol (100 parts per 100 parts of particulate polymer) as a polyhydric alcohol compound was added to the resultant mixture, and deionized water was also added to obtain a composition for adhesion having a solid content concentration of 15%.

<Production of Negative Electrode Web>

A 5 MPa pressure-resistant vessel equipped with a stirrer was charged with 33 parts of 1,3-butadiene, 3.5 parts of itaconic acid, 63.5 parts of styrene, 0.4 parts of sodium dodecylbenzenesulfonate as an emulsifier, 150 parts of deionized water, and 0.5 parts of potassium persulfate as a polymerization initiator. These materials were sufficiently stirred and were then heated to 50° C. to initiate polymerization. At the point at which the polymerization conversion rate reached 96%, the reaction was quenched by cooling to obtain a mixture containing a binder for a negative electrode mixed material layer (SBR). The mixture containing the binder for a negative electrode mixed material layer was adjusted to pH 8 through addition of 5% sodium hydroxide aqueous solution and was then subjected to thermal-vacuum distillation to remove unreacted monomer. Thereafter, cooling was performed to 30° C. or lower to obtain a water dispersion containing the desired binder for a negative electrode mixed material layer.

Next, 100 parts of artificial graphite (volume-average particle diameter: 15.6 μm) as a negative electrode active material, 1 part in terms of solid content of a 2% aqueous solution of carboxymethyl cellulose sodium salt (produced by Nippon Paper Industries Co., Ltd.; product name: MAC350HC) as a viscosity modifier, and deionized water were mixed, were adjusted to a solid content concentration of 68%, and were then further mixed at 25° C. for 60 minutes. The solid content concentration was further adjusted to 62% with deionized water and then a further 15 minutes of mixing was performed at 25° C. Deionized water and 1.5 parts in terms of solid content of the water dispersion containing the binder for a negative electrode mixed material layer described above were added to the resultant mixture, the final solid content concentration was adjusted to 52%, and a further 10 minutes of mixing was performed. The resultant mixture was subjected to a defoaming process under reduced pressure to yield a slurry composition for a secondary battery negative electrode having good fluidity.

The obtained slurry composition for a secondary battery negative electrode was applied onto both surfaces of copper foil (current collector) of 20 μm in thickness using a comma coater such as to have a thickness after drying of approximately 150 μm. The applied slurry composition was dried by conveying the copper foil inside a 60° C. oven for 2 minutes at a speed of 0.5 m/min. Thereafter, 2 minutes of heat treatment was performed at 120° C. to obtain a pre-pressing negative electrode web. The pre-pressing negative electrode web was rolled by roll pressing to obtain a post-pressing negative electrode web having a negative electrode mixed material layer thickness of 80 μm.

<Production of Positive Electrode Web>

A slurry composition for a secondary battery positive electrode was obtained by mixing 100 parts of LiCoO₂ having a volume-average particle diameter of 12 μm as a positive electrode active material, 2 parts of acetylene black (produced by Denka Company Limited; product name: HS-100) as a conductive material, 2 parts in terms of solid content of polyvinylidene fluoride (produced by Kureha Corporation; product name: #7208) as a binder, and N-methylpyrrolidone as a solvent, adjusting these materials to a total solid content concentration of 70%, and mixing these materials using a planetary mixer.

The obtained slurry composition for a secondary battery positive electrode was applied onto both surfaces of aluminum foil (current collector) of 20 μm in thickness using a comma coater such as to have a thickness after drying of approximately 150 μm. The applied slurry composition was dried by conveying the aluminum foil inside a 60° C. oven for 2 minutes at a speed of 0.5 m/min. Thereafter, 2 minutes of heat treatment was performed at 120° C. to obtain a positive electrode web.

The obtained positive electrode web was rolled by a roll press to obtain a post-pressing positive electrode web including positive electrode mixed material layers.

<Preparation of Separator Web>

A separator web (product name: Celgard 2500) made of polypropylene (PP) was prepared.

<Production of Laminate>

Figure 8:
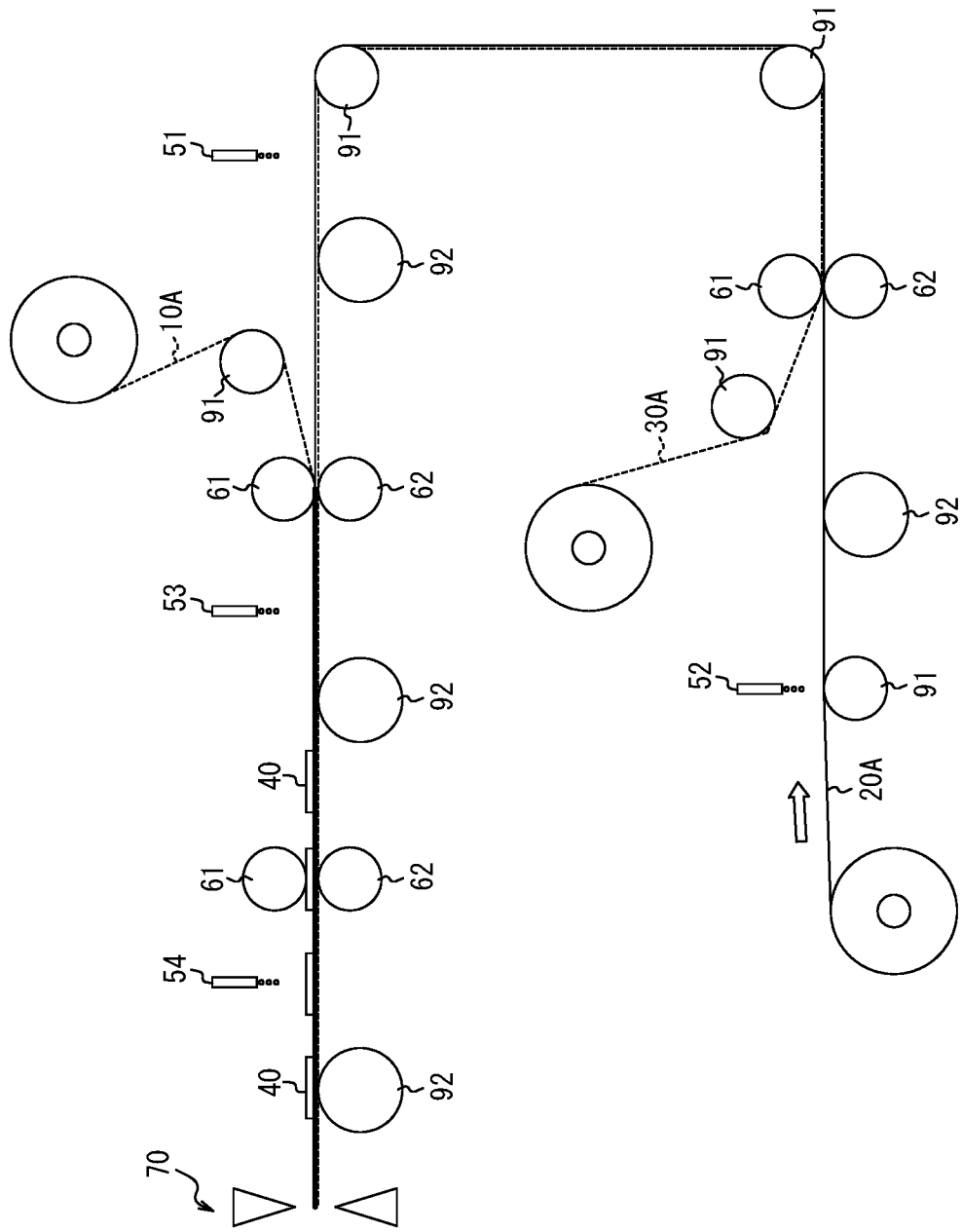
FIG. 8 is an explanatory diagram illustrating a production process of a laminate in examples and a comparative example.

The composition for adhesion, the negative electrode web, the positive electrode web, and the separator web that had been produced were used to produce a laminate as illustrated in FIG. 8. Note that reference sign 91 in FIG. 8 indicates a conveying roller, whereas reference sign 92 in FIG. 8 indicates a heat roller.

Specifically, a negative electrode web 20A fed from a negative electrode web roll was conveyed at a speed of 10 m/min while the composition for adhesion was supplied onto one surface of the negative electrode web 20A from an inkjet head of an inkjet-type coating machine 52 (KM1024 (shear-mode type) produced by Konica) and a second separator web 30A fed from a separator web roll was affixed to the negative electrode web 20A by pressure bonding rollers 61 and 62. The composition for adhesion was also supplied onto the other surface of the negative electrode web 20A from an inkjet head of an inkjet-type coating machine 51 (KM1024 (shear-mode type) produced by Konica), and a first separator web 10A fed from a separator web roll was affixed to the laminate of the negative electrode web 20A and the second separator web 30A by pressure bonding rollers 61 and 62. In addition, the composition for adhesion was supplied onto a surface of the first separator web 10A at the opposite side thereof to the negative electrode web 20A from an inkjet head of an inkjet-type coating machine 53 (KM1024 (shear-mode type) produced by Konica), positive electrodes 40 that had been cut in advance were placed thereon, and the positive electrodes 40 were affixed to the laminate of the first separator web 10A, the negative electrode web 20A, and the second separator web 30A by pressure bonding rollers 61 and 62. Furthermore, the composition for adhesion was supplied onto the positive electrodes 40 from an inkjet head of an inkjet-type coating machine 54 (KM1024 (shear-mode type) produced by Konica), and cutting was subsequently performed by a cutting machine 70 to obtain laminates in which a second separator, a negative electrode, a first separator, and a positive electrode were stacked in stated order.

Note that supply of the composition for adhesion from the coating machine 51 and the coating machine 53 was performed with specific supply amounts set such that the coating weight A of the adhesive material in an inner region P was less than the coating weight B of the adhesive material in an outer region Q as illustrated in FIGS. 1A and 1B. Specifically, a region having a center of an affixing surface X or Y of an electrode and a separator as a center, having a similar shape to a shape of the affixing surface X or Y, and having an area equivalent to 70% of the area of the affixing surface X or Y was defined as a "region of sparse application" in Table 1, a part of the affixing surface X or Y other than the "region of sparse application" was defined as a "region of dense application", and application was performed such that the "coating weight in the region of dense application" was 0.150 g/m² and the "coating weight in the region of sparse application" was 0.050 g/m².

Supply of the composition for adhesion from the coating machines 52 and 54 was performed such that the coating weight of the adhesive material was as shown in Table 1.

By performing application in this manner, the "coating weight in the outer region Q" was 0.150 g/m², the "coating weight in the inner region P" was 0.063 g/m², and the "coating weight for the entire surface Z (affixing surface X or Y)" was 0.080 g/m² as indicated by the following calculation formulae.

Coating weight in outer region Q (g/m²)=Coating weight in region of dense application (g/m²)

Coating weight in inner region P (g/m²)=(Coating weight in region of sparse application (g/m²) x Area ratio of region of sparse application (%)/100+Coating weight in region of dense application (g/m²)×(80−Area ratio of region of sparse application (%))/100)/0.80 Coating weight for entire surface Z (g/m²)=Coating weight in region of sparse application (g/m²) x Area ratio of region of sparse application (%)/100+ Coating weight in region of dense application (g/m²) x Area ratio of region of dense application (%)/100=Coating weight in inner region P (g/m²)×0.8+Coating weight in outer region Q (g/m²)×0.2

Note that affixing by pressure bonding rollers 61 and 62 was performed at a temperature of 70° C. and a pressure of 3 MPa.

Moreover, the supplied composition for adhesion was dried (drying temperature: 70° C.; drying time: 1 s) by using heat rollers 92 as some of the conveying rollers 91.

Upon observation of a dried slurry (adhesive material that was a dried material) using a laser microscope, the adhesive material had a fine dotted shape. In other words, fine dots of the adhesive material were arranged in a pattern at the affixing surface.

The dry adhesive strength of the laminate was evaluated. The result is shown in Table 1.

<Production of Secondary Battery>

Five laminates that had been produced were stacked and were pressed at a temperature of 70° C. and a pressure of 3 MPa for 10 seconds to obtain a stack.

The produced stack was enclosed in an aluminum packing case serving as a battery case, and electrolyte solution (solvent: ethylene carbonate/diethyl carbonate/vinylene carbonate=68.5/30/1.5 (volume ratio); electrolyte: $LiPF_6$ of 1 M in concentration) was injected. An opening of the aluminum packing case was subsequently closed by heat sealing at 150° C. to produce a stacked lithium ion secondary battery having a capacity of 800 mAh.

The electrolyte solution injectability of the secondary battery, the cycle characteristics of the secondary battery, and the lithium deposition rate on a negative electrode were evaluated. The results are shown in Table 1.

Examples 2 to 6

An adhesive material, a composition for adhesion, a negative electrode web, a positive electrode web, a separator web, a laminate, and a secondary battery were produced and prepared in the same way as in Example 1 with the exception that the composition for adhesion was supplied from the coating machine 51 and the coating machine 53 with the "area of the region of dense application", "area of the region of sparse application", "coating weight in the region of dense application", and "coating weight in the region of sparse application" set as specific values such that the coating weight A of the adhesive material in an inner region P at a surface Z (affixing surface X or Y), the coating weight B of the adhesive material in an outer region Q at the surface Z (affixing surface X or Y), and the coating weight C of the adhesive material for the entire surface Z (affixing surface X or Y) were as shown in Table 1.

Various evaluations were also performed in the same way as in Example 1. The results are shown in Table 1.

Comparative Example 1

An adhesive material, a composition for adhesion, a negative electrode web, a positive electrode web, a separator web, a laminate, and a secondary battery were produced and prepared in the same way as in Example 1 with the exception that gravure coaters were used instead of inkjet type coating machines as the coating machines 51-54, and the adhesive material was applied over the entirety of an affixing surface with a coating weight of 0.2 g/m².

Various evaluations were also performed in the same way as in Example 1. The results are shown in Table 1.

REFERENCE SIGNS LIST

10 first separator
10A first separator web
20 negative electrode
20A negative electrode web
21 negative electrode current collector
22, 23 negative electrode mixed material layer
24 first edge
25 second edge
26 third edge
27 fourth edge
30 second separator
30A second separator web
40 positive electrode
41 positive electrode current collector
42, 43 positive electrode mixed material layer
50 droplet
51-54 coating machine (nozzle head)
55 nozzle
60 substrate
61, 62 pressure bonding roller
70 cutting machine
91 conveying roller
92 heat roller
Z surface
R center
P inner region

TABLE 1

| | | Example 1 | Example 2 | Example 3 | Example 4 | Example 5 | Example 6 | Comparative Example 1 |
|---|---|---|---|---|---|---|---|---|
| Application conditions | Application method | Inkjet | Inkjet | Inkjet | Inkjet | Inkjet | Inkjet | Gravure |
| | Supply shape of adhesive material | Dot | Dot | Dot | Dot | Dot | Dot | Entire surface |
| | Area ratio of region of dense application [%] | 30 | 50 | 70 | 30 | 30 | 70 | 100 |
| | Coating weight in region of dense application [g/m²] | 0.150 | 0.150 | 0.150 | 0.300 | 0.150 | 0.250 | 0.200 |
| | Area ratio of region of sparse application [%] | 70 | 50 | 30 | 70 | 70 | 30 | 0 |
| | Coating weight in region of sparse application [g/m²] | 0.050 | 0.000 | 0.050 | 0.050 | 0.120 | 0.100 | — |
| | Coating weight in outer region Q [g/m²] | 0.150 | 0.150 | 0.150 | 0.300 | 0.150 | 0.250 | 0.200 |
| | Coating weight in inner region P [g/m²] | 0.063 | 0.056 | 0.113 | 0.081 | 0.124 | 0.194 | 0.200 |
| | Coating weight for entire surface Z [g/m²] | 0.080 | 0.075 | 0.120 | 0.125 | 0.129 | 0.205 | 0.200 |
| Evaluation | Dry adhesive strength | A | A | A | A | A | A | A |
| | Electrolyte solution injectability | A | A | B | A | C | B | D |
| | Cycle characteristics | A | A | A | A | A | C | C |
| | Lithium deposition rate on negative electrode | A | A | A | C | A | B | C |

It can be seen from Table 1 that permeability (injectability) of electrolyte solution could be improved in Examples 1 to 6. On the other hand, it can be seen that permeability (injectability) of electrolyte solution was low in Comparative Example 1 in which the adhesive material was applied uniformly over the entirety of an affixing surface.

INDUSTRIAL APPLICABILITY

According to the present disclosure, it is possible to obtain a secondary battery that can improve permeability (injectability) of electrolyte solution to a central part of a positive electrode or a negative electrode.

Moreover, according to the present disclosure, it is possible to efficiently produce a secondary battery that can improve permeability (injectability) of electrolyte solution to a central part of a positive electrode or a negative electrode.

Q outer region
100, 100A laminate
200 stack
300 particulate polymer
310 core portion
310S outer surface of core portion
320 shell portion

The invention claimed is:

1. A secondary battery comprising a laminate in which a positive electrode, a separator, and a negative electrode are stacked in stated order, wherein
coating weight of an adhesive material at a surface Z that is either or both of an affixing surface X of the positive electrode and the separator and an affixing surface Y of the negative electrode and the separator satisfies a relationship formula (1), shown below, $$A(g/m^2)+0.02(g/m^2)<B(g/m^2) \qquad (1)$$

where, in the relationship formula (1), A represents coating weight in an inner region P at the surface Z and B represents coating weight in an outer region Q at the surface Z, given that the inner region P is a region that has a center of the surface Z as a center, has a similar shape to a shape of the surface Z, and has an area equivalent to 80% of area of the surface Z, and the outer region Q is all regions other than the inner region P at the surface Z, wherein coating weight A in the inner region P is not less than 0 $g/m^2$ and not more than 0.20 $g/m^2$ and coating weight B in the outer region Q is not less than 0.05 $g/m^2$ and not more than 0.30 $g/m^2$.

2. The secondary battery according to claim 1, wherein coating weight C of the adhesive material for the surface Z as a whole is not less than 0.01 $g/m^2$ and not more than 1.00 $g/m^2$.

3. The secondary battery according to claim 1, wherein the adhesive material has a degree of swelling of not less than 110% and not more than 1500% in a mixed solvent of ethylene carbonate and diethyl carbonate in which a volume ratio of ethylene carbonate/diethyl carbonate is 3/7.

4. The secondary battery according to claim 1, wherein the adhesive material has been formed in a dotted shape.

5. A method of producing the secondary battery according to claim 1, the method comprising:

a first application step of applying the adhesive material with a first application amount in a first region at the surface Z that is either or both of the affixing surface X of the positive electrode and the separator and the affixing surface Y of the negative electrode and the separator; and a second application step of applying the adhesive material with a second application amount in a second region disposed further inward than the first region at the surface Z, wherein the first application amount is more than the second application amount.

* * * * *